United States Patent Office 3,191,758
Patented June 29, 1965

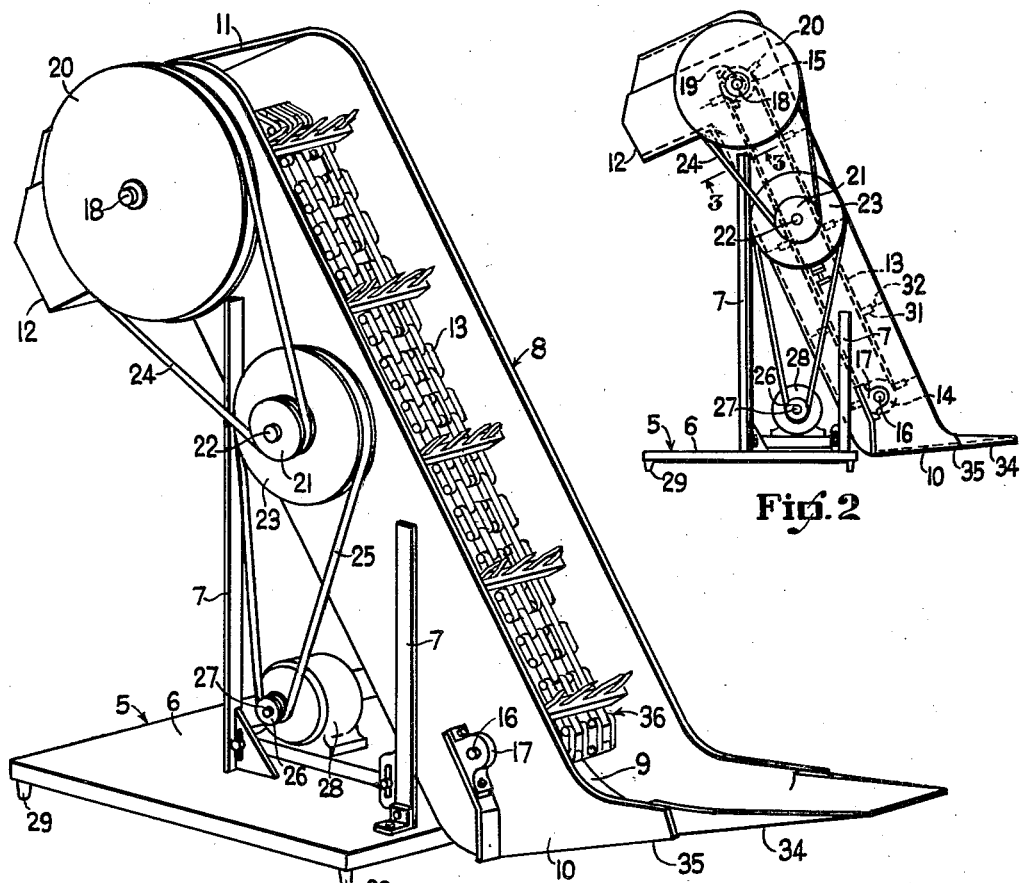

3,191,758
MODIFIED FLIGHT CONVEYOR FOR
OILY METAL CUTTINGS
Arley Adams, R.D. 1, Republic, Ohio
Filed Aug. 5, 1963, Ser. No. 300,025
1 Claim. (Cl. 198—174)

This invention relates to the art of materials handling and, more particularly, to an apparatus designed for moving such materials as metal cuttings, especially those saturated with cutting oil, from the vicinity of their discharge from a cutting machine to scrap containers. The apparatus of this invention is a modification of a flight conveyor wherein the usual solid flights are augmented by flexible sweeps and the conveyor can be operated at any acute angle of inclination.

The development of time and labor saving mechanical and electromechanical materials handling devices has become an art. Variations in the materials to be handled and the type of handling desired have produced a variety of devices specially suited for certain jobs. These devices include conveyors in various forms such as belt conveyors, flight conveyors, roller conveyors, chutes, elevators, and hand and power driven trucks. These devices have varied in their success in solving the variety of materials handling problems which have faced industry.

A particularly severe problem has been that dealing with the removal and disposal of metal scrap produced in commercial metal stamping and cutting operations. Production presses employed in such operations, especially in the manufacture of small parts, create incidental to their operation cuttings of various sizes and shapes. Since the die cutting lubricants are often used in the operation of such presses, both the stamped parts and the scrap cuttings are typically oily. Normally, the parts and cuttings are removed from the presses by gravity, falling below the machine where they are separated.

After separation of parts and cuttings they have heretofore been conveyed from their place of deposit upward to separate containers by a number of different mechanisms all of which have proved to be unsatisfactory in one or more respects. One of the common mechanisms employed for this purpose has been the common belt conveyor in which the belt was fibrous or rubberized. However, the cutting oil on the parts and cuttings has deteriorated this type of belt causing frequent conveyor breakdowns and necessitating frequent belt changes. In addition, this type of belt has been quite susceptible to the abrasion of the parts and cuttings so that the use of oil-resistant rubber in belts has not solved the problem. Another of the common mechanisms used for conveying oily metal parts and oily metal cuttings has been a belt conveyor employing a steel web type of belt, usually with metal cleats. However, it has been found that small parts and cuttings become enmeshed in the belt web or mesh, thereby impeding and often jamming the belt linkages whereby the conveyor has stopped or has had to be stopped, and the offending metal has had to be extracted from the belt.

Belt-type conveyors have also proven to be unsatisfactory in this application because of two functional idiosyncrasies.

First, in belt conveyors the belt is designed to carry the material being conveyed. When such material is to be elevated, there is a limit to the inclination to which a belt can be elevated, and still operate efficiently. The addition of cleats or plates to the belt does not effectively increase the maximum inclination at which a belt conveyor can be efficiently operated.

Second, since the conveying function of a belt is served on the upper upward run of the belt, there must be room for the return run below this upward run, for the belt to turn from its return run to its upward run, especially where cleats or other assisting devices are attached to the belt, and for the drive sprockets or pulleys. These features necessitate that a loading apron for the belt conveyor be at least several inches and usually at least a foot or more off the floor.

The second idiosyncrasy has been avoided in similar conveying situations in the past by the use of flight conveyors. However, flight conveyors have been thought to be impractical for abrasive or corrosive materials and have been limited in thir previous uses to angles of inclination of no more than about 30 degrees because of the flow of material backward over the tops of the flights.

It is the primary object of this invention to provide a satisfactory conveyor for moving small metal parts and scrap cuttings, especially oily parts and cuttings from their place of deposit to a bin or the like located on a higher level. Another object of this invention is to provide modifications to the standard type of flight conveyor whereby the modified conveyor can be used to convey oily small metal parts and oily scrap cuttings from floor level up inclines in excess of 45 degrees and as high as 60 or 70 degrees to scrap containers. Another object is to provide such a modified flight conveyor which is compact, self-contained with the exception of an electric power source, and easily transportable. Another object is to provide such a conveyor which has a minimum number of parts and whose parts are constructed from materials normally found in any machine shop or factory, thereby reducing the time and cost of any necessary repairs compared to the time and cost when repairs are necessary on machinery which is custom-made from specially formed parts. Another object of this invention is to provide such a conveyor that can be used for raising nearly any small object regardless of shape. These objects are all satisfied by this invention.

This crux of this invention resides in the use in a flight conveyor of flights to which are attached flexible sweeps. The flight conveyor can have either scraper flights or suspended flights which can be driven by a single, double or multiple run conveyor chain or belt. The flexible sweeps are preferably employed with a modified trough.

For further understanding of this invention attention is directed to the accompanying drawing composed of three figures.

FIGURE 1 is a perspective view of one embodiment of this invention ready for use.

FIGURE 2 is a side view of the embodiment of FIGURE 1.

FIGURE 3 is a section on a line corresponding to line 3—3 of FIGURE 2 and shows one embodiment of a flight modified with two types of flexible sweeps used in conjunction with a modified trough.

The reference characters refer to the same parts throughout the several views of the drawing.

With reference now to the drawing in detail, FIGURES 1 and 2 illustrate an embodiment 5 of the conveyor of this invention. This embodiment has a flat base 6 which rests on four feet 29. On the base 6 are vertically mounted four uprights 7 that support a conveyor consisting of a chute 8 composed of a bottom panel 9 and a pair of parallel and equally spaced sides 10. The chute 8 is basically Z-shaped when viewed from either side and is provided with a cover plate 11 over the upper portion of the discharge end 12. A roller chain 13 encompasses in part the idler sprockets 14 and the drive sprockets 15. The idler sprockets 14 are mounted on a shaft 12, each end of which is externally supported by pillow blocks 17. The idler sprockets 14 and their supporting shaft 16 are located in the lower end of the chute 8, while the drive sprockets 15, which are mounted on the drive shaft 18 supported by pillow blocks 19, are located in the upper end of the chute 8. A drive pulley 20 is mounted on one outer end of the drive shaft 16. A small pulley 21 and a large pulley 23 are mounted on the outer end of the stub shaft 22. A motor pulley 26 is mounted on the end of a shaft 27 of an electric motor 28 mounted on the base 6. A belt 25 encompasses in part the motor pulley 26 and the large pulley 23, while an alike belt 24 encompasses in part the small pulley 21 and the drive pulley 20. The motor 28 drives pulley 26 which drives pulley 23. Pulley 23 drives pulley 21 by a direct connection, and pulley 21 drives pulley 20 which drives the drive sprockets 15. A loading apron 34 is attached to the lower end 35 of the chute 8 in order to provide a natural means of flow for whatever materials are to be elevated by this invention to a hopper or other container.

Equally spaced around the roller chain 13 are sections provided with a plurality of special links 30, to which is secured a rectangular flight 31, to which is secured a plurality of flexible sweeps 32. One such section is depicted in FIGURE 3. FIGURE 3 shows further that the aforesaid panel 9 is contoured to receive the outer ends 33 of the flexible sweeps 32. The flexible sweeps 32 and details connecting them to the roller chain 13 are characterized in their entirety by the reference numeral 36 and are hereinafter known as the carriers.

It is to be understood that many changes can be made in the detailed construction of the conveyor of this invention, and the invention will still fall within the scope and intent of the appended claims. The entire conveyor can be angularly adjustable as well as adjustable in height, for example, by provision for adjustments between the uprights 7 and the chute 8, although no such details of construction are shown in the appended drawings. The flights 31 are usually simple pieces of angle or channel steel but can be of varied design so long as they do not interfere with the operation of the flexible sweeps. The flexible sweeps 32 can be of any size, shape or tensile quality and can be spaced as needed. They can be, for example, simple lengths of cable, fingers of spring steel, wire mesh sweeps, or sweeps having specially shaped outer ends 33 for the pick-up of special parts or materials in different forms from that usually found in the average manufacturing plant. The entire conveyor can be fabricated from any practical material.

Furthermore, the cross-sectional dimensions and configuration of the chute 8 can vary widely. The chute 8 can be rectilinear in cross-section, but it is preferable that at least the bottom panel 9 and possibly the sides 10 conform generally to the overall shape of the carriers 36 and especially to the free ends of the sweeps 32 as shown in FIGURE 3. The conveyor can be further modified by division bars or partitions bisecting the apron 34, chute 8 and discharge 12 to convey both parts and cuttings into separate containers.

Material is lifted by this conveyor by being carried upward by the flexible sweeps 32 between the bottom of the chute 8 and the roller chain 13 to the discharge end 12 where the material drops off the sweeps into the intended containers. The flexible quality of the sweeps offers a measured sweeping effect sufficient to convey the parts and cuttings but enough resilience to avoid any clogging or jamming of the sweeps sufficient to stop the conveyor or injure the parts.

The conveyor of this invention is especially suited for moving and elevating small machine parts and scrap cuttings, especially when oily, but can be used effectively for the handling of any bulk material, especially where the physical characteristics of the material other than weight make the material difficult to handle by other means.

Having thus described my invention, what I claim is:

In a transportable conveyor for the movement of small parts and the like comprising a chute, said chute being mounted at an acute angle on a supporting base, a roller chain rotatably mounted on and suspended between idler sprockets and drive sprockets within said chute, each sprocket being secured to a shaft that has each end extending outward through the sides of said chute and supported by a pillow block, a plurality of carriers secured to said roller chain in equal spaced relation to each other and an electric motor mounted on said base and rotating said chain by means of a pair of belts encompassing in part a plurality of pulleys mounted outward of one side of said chute, said carriers thereby moving whatever materials that fall within the lower end of said chute up said chute to a point of discharge at the upper end of the said chute, said chute having a scoop at the lower end thereof, the upper end of said chute adapted to discharge materials being elevated by said carriers, the discharge portion of said chute having a top plate thereon in order to prevent any materials being thrown out of said chute as said carriers pass over said drive sprockets located in the upper end of said chute, the improvement wherein the carriers comprise flexible sweeps having finger-like configurations.

References Cited by the Examiner
UNITED STATES PATENTS

| | | | |
|---|---|---|---|
| 1,536,331 | 5/25 | Conant | 198—174 |
| 2,773,586 | 12/56 | Schmidtke | 198—233 |
| 3,111,216 | 11/63 | Geberin | 198—174 |

SAMUEL F. COLEMAN, *Primary Examiner.*

WILLIAM B. LA BORDE, *Examiner.*